(12) United States Patent
Grant et al.

(10) Patent No.: US 10,671,808 B2
(45) Date of Patent: *Jun. 2, 2020

(54) PRONOUN MAPPING FOR SUB-CONTEXT RENDERING

(71) Applicant: International Business Machines Corporation, Armonk, NY (US)

(72) Inventors: Robert H. Grant, Austin, TX (US); Trudy L. Hewitt, Cary, NC (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/803,934

(22) Filed: Nov. 6, 2017

(65) Prior Publication Data
US 2019/0138593 A1 May 9, 2019

(51) Int. Cl.
| | |
|---|---|
| G06F 17/27 | (2006.01) |
| G06F 40/253 | (2020.01) |
| G06F 40/30 | (2020.01) |
| G06F 40/35 | (2020.01) |
| G06F 40/134 | (2020.01) |
| G06F 40/284 | (2020.01) |
| G06F 40/295 | (2020.01) |

(52) U.S. Cl.
CPC .......... *G06F 40/253* (2020.01); *G06F 40/134* (2020.01); *G06F 40/284* (2020.01); *G06F 40/295* (2020.01); *G06F 40/30* (2020.01); *G06F 40/35* (2020.01)

(58) Field of Classification Search
CPC .................................................... G06F 17/27
USPC ..... 704/235, 9, 246, 231, 234, 10, 251, 247, 704/252; 707/755; 455/466, 412.1, 455/412.2, 413
See application file for complete search history.

(56) References Cited

U.S. PATENT DOCUMENTS

| | | | | |
|---|---|---|---|---|
| 4,420,816 A | * | 12/1983 | Yoshida | G06F 17/289 |
| | | | | 715/236 |
| 4,964,044 A | * | 10/1990 | Kumano | G06F 17/271 |
| | | | | 704/2 |
| 5,091,950 A | * | 2/1992 | Ahmed | G06F 17/2863 |
| | | | | 704/277 |
| 5,146,406 A | * | 9/1992 | Jensen | G06F 17/271 |
| | | | | 704/9 |
| 5,218,537 A | * | 6/1993 | Hemphill | G06F 17/274 |
| | | | | 704/1 |
| 5,423,032 A | * | 6/1995 | Byrd | G06F 16/313 |
| | | | | 704/1 |

(Continued)

OTHER PUBLICATIONS

"List of IBM Patents or Patent Applications Treated as Related," Letter from Leslie A. Van Leeuwen, dated Dec. 19, 2017, 1 page.

(Continued)

*Primary Examiner* — Michael Colucci
(74) *Attorney, Agent, or Firm* — VanLeeuwen & VanLeeuwen; Alexander G. Jochym

(57) ABSTRACT

An approach is provided to detect pronouns that are included in textual posts that are found in an online discussion. The textual posts are analyzed using a natural language processing speech classification technique, that results in an identification of a noun to which the detected pronoun refers. The system then displays, on a display device, the noun to which the pronoun refers.

11 Claims, 9 Drawing Sheets

(56) References Cited

U.S. PATENT DOCUMENTS

| | | | | |
|---|---|---|---|---|
| 6,125,342 | A * | 9/2000 | Selesky | G06F 17/274 704/9 |
| 6,685,476 | B1 * | 2/2004 | Safran, Sr. | G09B 7/02 434/169 |
| 7,475,344 | B1 * | 1/2009 | Patil | G06F 3/0237 704/246 |
| 7,917,460 | B2 * | 3/2011 | Talbot | G06N 5/022 706/59 |
| 8,606,568 | B1 * | 12/2013 | Tickner | G10L 15/1815 704/231 |
| 9,042,923 | B1 * | 5/2015 | Mirho | H04W 4/14 455/412.1 |
| 9,047,283 | B1 * | 6/2015 | Zhang | G06F 17/2705 |
| 9,170,993 | B2 | 10/2015 | Kalia et al. | |
| 9,614,807 | B2 | 4/2017 | Spivack et al. | |
| 9,910,918 | B2 * | 3/2018 | Bastide | G06F 16/345 |
| 2002/0052900 | A1 * | 5/2002 | Freeman | G06F 3/0237 715/262 |
| 2003/0101047 | A1 * | 5/2003 | Panttaja | G06F 17/2785 704/9 |
| 2004/0107088 | A1 * | 6/2004 | Budzinski | G06F 17/27 704/10 |
| 2006/0136352 | A1 * | 6/2006 | Brun | G06F 17/2755 |
| 2008/0097748 | A1 * | 4/2008 | Haley | G06F 17/2785 704/9 |
| 2008/0221892 | A1 * | 9/2008 | Nathan | G06F 17/279 704/257 |
| 2009/0066722 | A1 * | 3/2009 | Kriger | G06Q 30/02 345/619 |
| 2009/0271179 | A1 * | 10/2009 | Marchisio | G06F 16/3338 704/9 |
| 2009/0319911 | A1 | 12/2009 | McCann et al. | |
| 2010/0063799 | A1 * | 3/2010 | Jamieson | G06F 16/36 704/9 |
| 2013/0013706 | A1 * | 1/2013 | Gupta | G06Q 10/10 709/206 |
| 2014/0059126 | A1 * | 2/2014 | Klemm | G06Q 50/01 709/204 |
| 2014/0108006 | A1 | 4/2014 | Vogel et al. | |
| 2015/0104766 | A1 * | 4/2015 | Vuong | G06F 3/0481 434/169 |
| 2015/0286685 | A1 * | 10/2015 | Coll | G06F 16/90332 707/755 |
| 2016/0154889 | A1 | 6/2016 | Allen et al. | |
| 2017/0017635 | A1 * | 1/2017 | Leliwa | G06F 17/271 |
| 2017/0017971 | A1 * | 1/2017 | Moreau | G06Q 30/0202 |
| 2017/0090700 | A1 | 3/2017 | Chen et al. | |
| 2018/0288477 | A1 * | 10/2018 | Gupta | H04N 21/4316 |
| 2019/0138594 | A1 * | 5/2019 | Grant | G06F 17/274 |
| 2019/0156826 | A1 * | 5/2019 | Cromack | G06F 16/483 |

OTHER PUBLICATIONS

Grant et al., "Pronoun Mapping for Sub-Context Rendering," U.S. Appl. No. 15/847,346, filed Dec. 19, 2017, 38 pages.

* cited by examiner

PRONOUN MAPPING FOR SUB-CONTEXT RENDERING

BACKGROUND

With the increasing usage of group messaging apps, it can be increasingly difficult for users to understand the person to which other users are referring. In a real-time conversation with ten users, during which any number of conversations could be taking place, users without full contextual understanding of the overall conversation can easily become confused. If these users are far enough removed from the initial segment of the conversation, it might be impossible for such users to understand which users are being referred to when personal pronouns are used in the conversation.

BRIEF SUMMARY

An approach is provided to detect pronouns that are included in textual posts that are found in an online discussion. The textual posts are analyzed using a natural language processing speech classification technique, that results in an identification of a noun to which the detected pronoun refers. The system then displays, on a display device, the noun to which the pronoun refers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
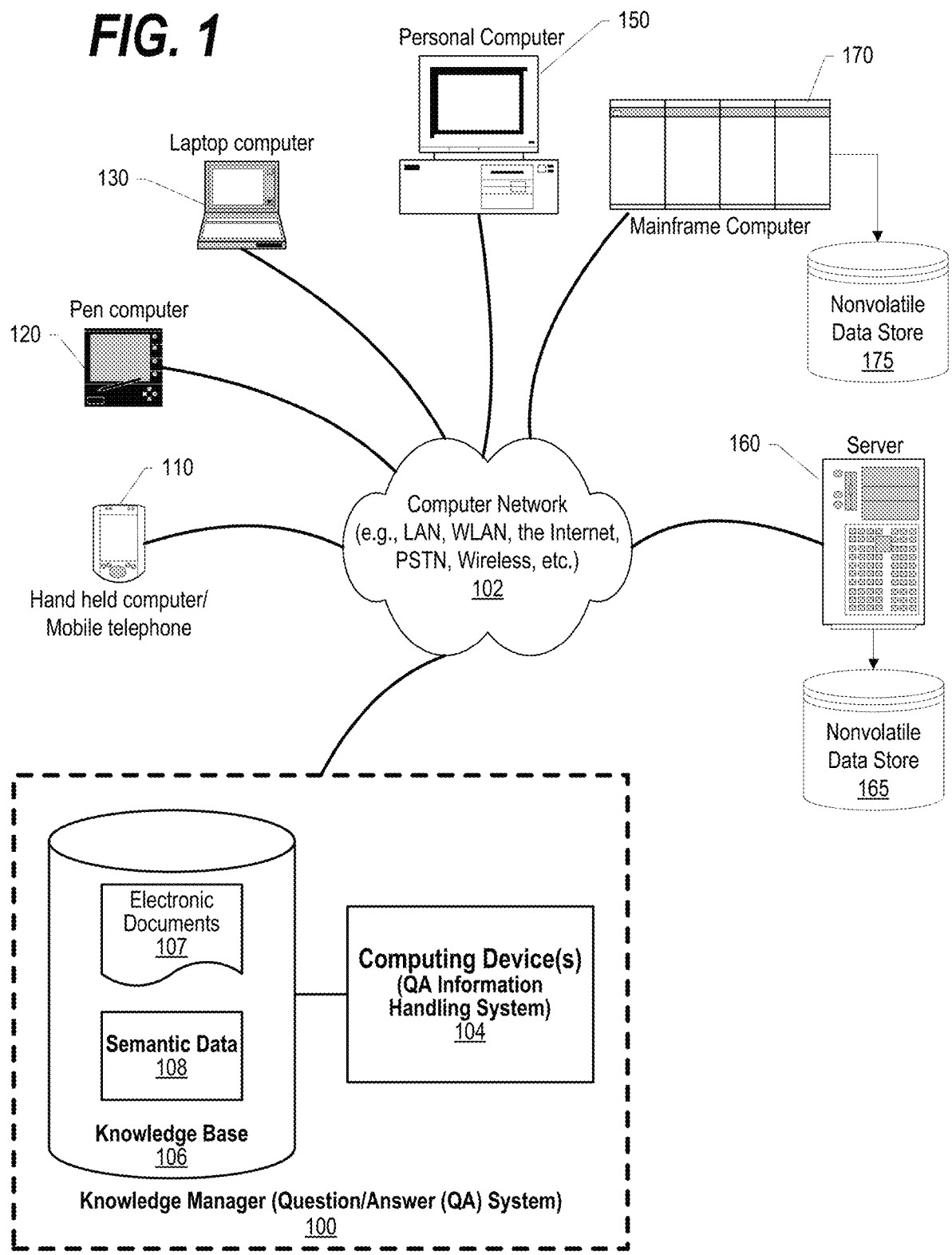
FIG. 1 depicts a schematic diagram of one illustrative embodiment of a question/answer creation (QA) system in a computer network.

FIGS. 1-9 depict an approach that performs pronoun mapping for sub-context rendering. The core idea is to use natural language processing and classified speech such as pronouns to generate a sub-conversation. The sub-conversation includes the parent-conversation entities identified by the personal pronouns and the entities that created the personal pronouns. A user interface is generated that allows the sub-conversation users to manage the ongoing messages relevant to the original pronoun identified speech while allowing them to continue to be a part of the larger group conversation. The user can optionally break the conversation into a sub-conversation interface so that only the relevant responses are shown.

Example Pronouns:

|  | SINGULAR | | | PLURAL | | |
| --- | --- | --- | --- | --- | --- | --- |
|  | subjective | objective | possessive | subjective | objective | possessive |
| 1st person | I | me | my, mine | we | us | our, ours |
| 2nd person | you | you | your, yours | you | you | your, yours |
| 3rd person | he she it | him her it | his her, hers its | they | them | their, theirs |

Traditional approaches require the users to operate in a different context from the original group conversation in order to maintain a relevant conversation. Similar solutions also require that a relevant entity is explicitly called out in the original message making it time consuming to use and grammatically awkward.

Additional embodiments to the approach described herein include an approach where alerts are used to notify a user of the pronoun relevant user's response or chatting in the group conversation. In addition, the project code name or nick name of a group or even the TV show's name can also be used when identifying a group.

The following example is an online discussion shown with analysis performed by the system that implements the pronoun mapping for sub-context rendering:

Nathan: "Hey everyone, you want to join us tonight?"
Identified Pronoun(s): you
Plurality Detected: everyone
Cognitive analysis: "you" referenced is referring to everyone in chat Ann: "I'm not sure yet—what time will you be leaving your house . . . can I ride with you?"
Identified Pronoun(s): you and your
Cognitive analysis: determines high confidence ranking that pronouns are referring to the person who originated the question, Nathan.

Sara: "I will be there! Can't wait to see the 3 of you! I'd like a ride too, if you have room."
  Identified Pronoun(s): you (×2)
  Plurality Detected: 3 of (in conjunction with first use of "you")
  Cognitive analysis: "3 of you" referenced is referring to other 3 participants in chat, "you" refers to Nathan, given analysis indicates connection with previous pronoun used by Ann to want to ride with Nathan
Rob: "Hey, yes definitely . . . . Do you want me to bring anything?"
  Identified Pronoun(s): you
  Cognitive analysis: determines high confidence ranking that pronouns are referring to the person who originated the question/conversation, Nathan.
  Hyperlink: "you" if clicked, Nathan's name would be shown
Nathan: "yes, if you want to bring some chips, that would be great . . . . I'm going to be home til 6 pm, if you two want to ride with me"
  Identified Pronoun(s): you and you two
  Plurality Detected: two (in conjunction with second use of "you")
  Cognitive analysis: determines high confidence ranking that first you is in response to Rob's question and you two is in response to Ann/Sara's questions Using the above analysis, the group chat interface using the approach described herein would display the conversation with references added to the pronouns so that the reader can quickly ascertain to whom the respective pronouns are referring. In one embodiment, hyperlinks are inserted proximate to the pronouns so that the reader can click on the hyperlink next to a pronoun and receive information on exactly who the pronoun refers. In another embodiment, the actual names of the individuals are inserted, such as in a parenthetical, next to the pronouns so that the referential pronoun names are readily seen without need to click a hyperlink.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
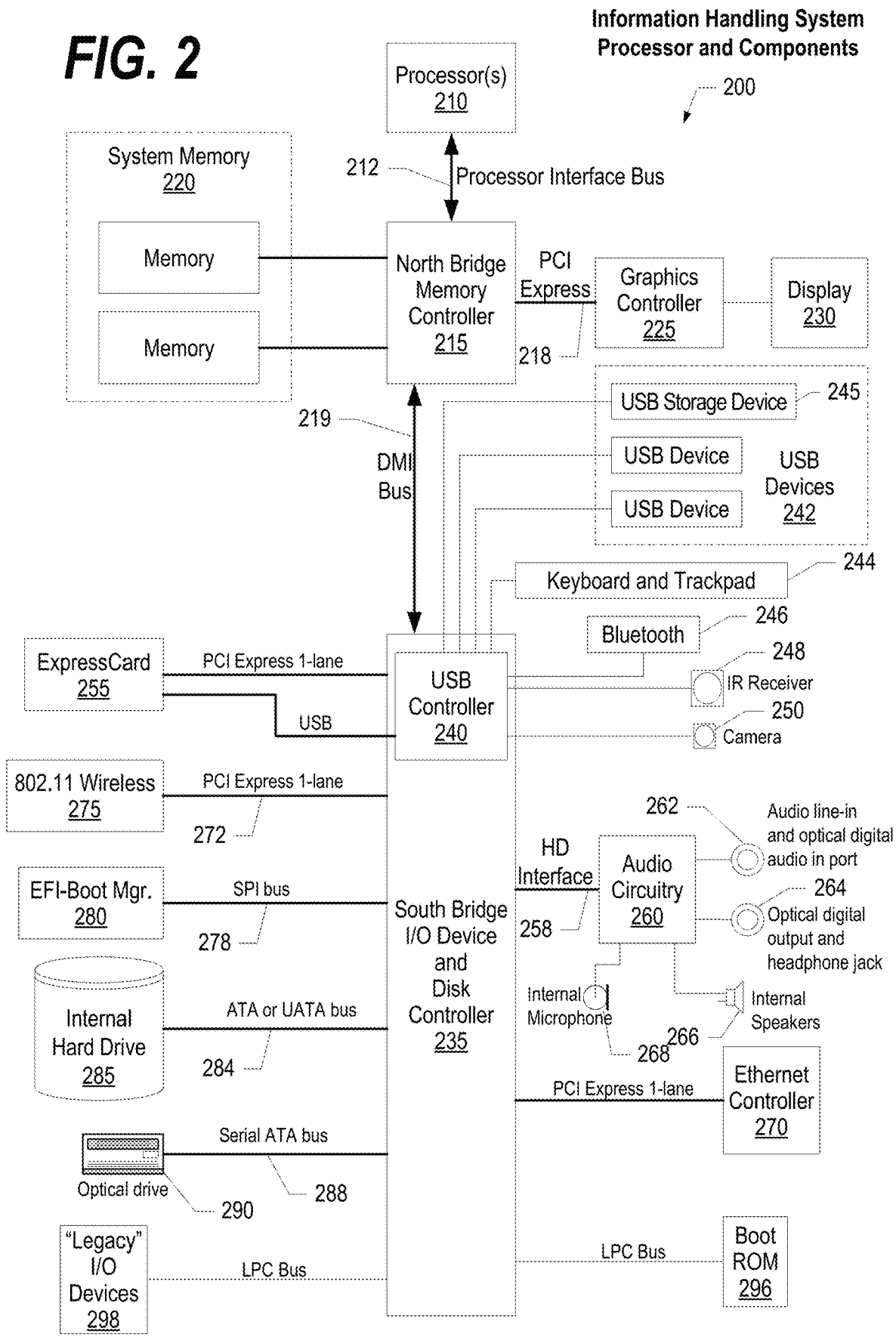
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
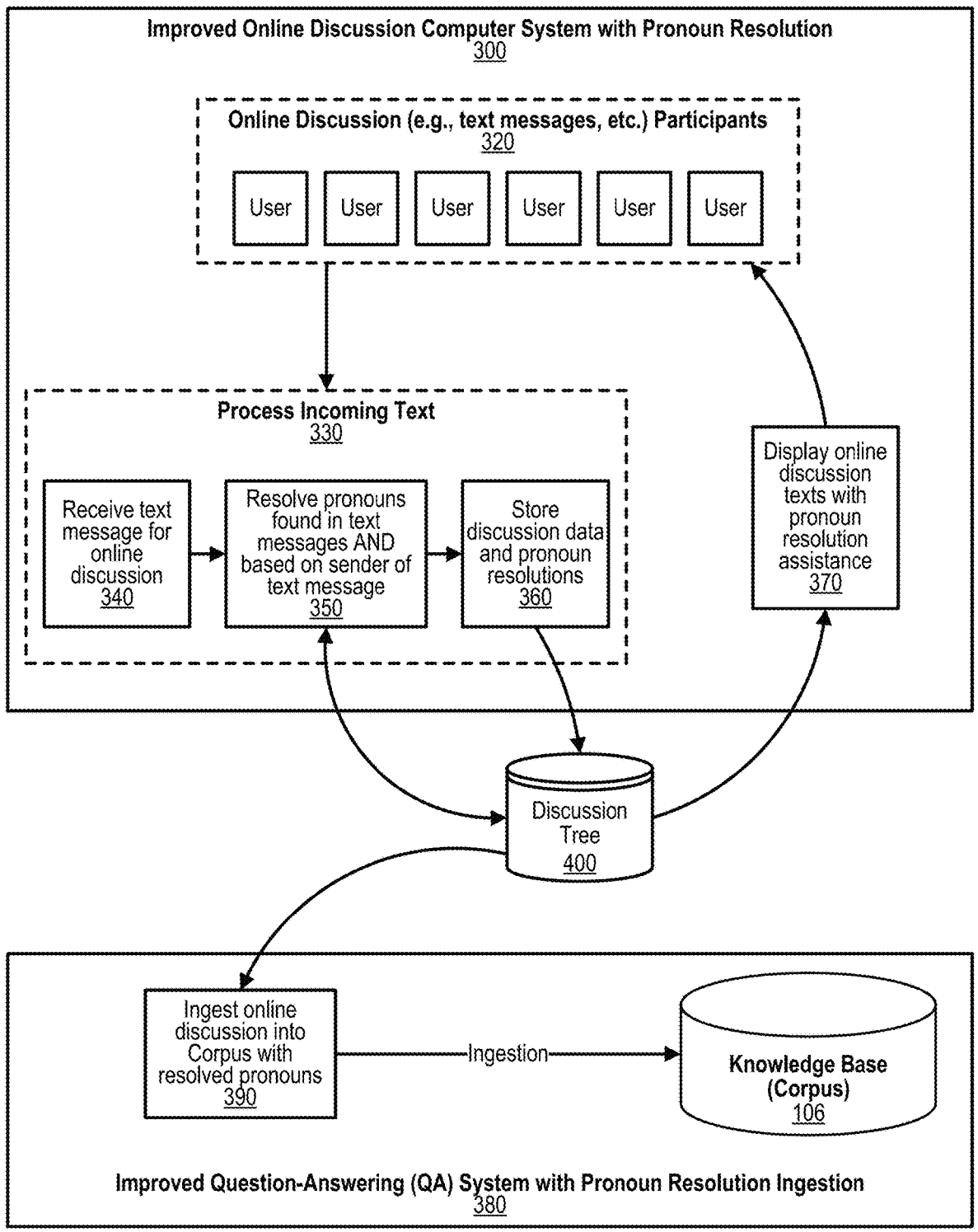
FIG. 3 is an exemplary diagram depicting detection of pronouns in textual posts and displaying the nouns to which the pronouns refer.

FIG. 3 is an exemplary diagram depicting detection of pronouns in textual posts and displaying the nouns to which the pronouns refer. Process 300 is an improved online discussion computer system with pronoun resolution. Users 320 are online discussion participants such as those that contribute textual posts to an online discussion, etc. At step 330, the system processes incoming text received from users 320 of the online discussion. Step 330 includes three primary processes as shown in steps 340 through 360. At step 340, the process receives a text message for the online discussion from one of users 320. At step 350, the process resolves any pronouns detected in the textual post. In addition, pronoun resolution can occur based on references to other participants in the discussion, such as someone responding to a post with a statement such as "she really knows what she is talking about!" referring to a previous post to the online discussion. At step 360, the process stores the discussion data and the pronoun resolutions in discussion tree 400. The data comprising the discussion tree is stored in data store 400.

At step 370, the process displays online discussion texts with pronoun resolution assistance. For example, a pronoun may be resolved with the person or persons to which the pronoun refers appearing in parenthetical text or a hyperlink may be displayed referencing the pronoun that, once selected, displays the person or persons to which the pronoun refers. Improved question-answering system 380 is shown with additional ingestion of discussion text with the pronouns found in the discussion text being resolved as described above. At step 390, the QA system's ingestion process ingests the online discussion into corpus 106 along with resolved pronouns of pronouns found in the discussion text.

Figure 4:
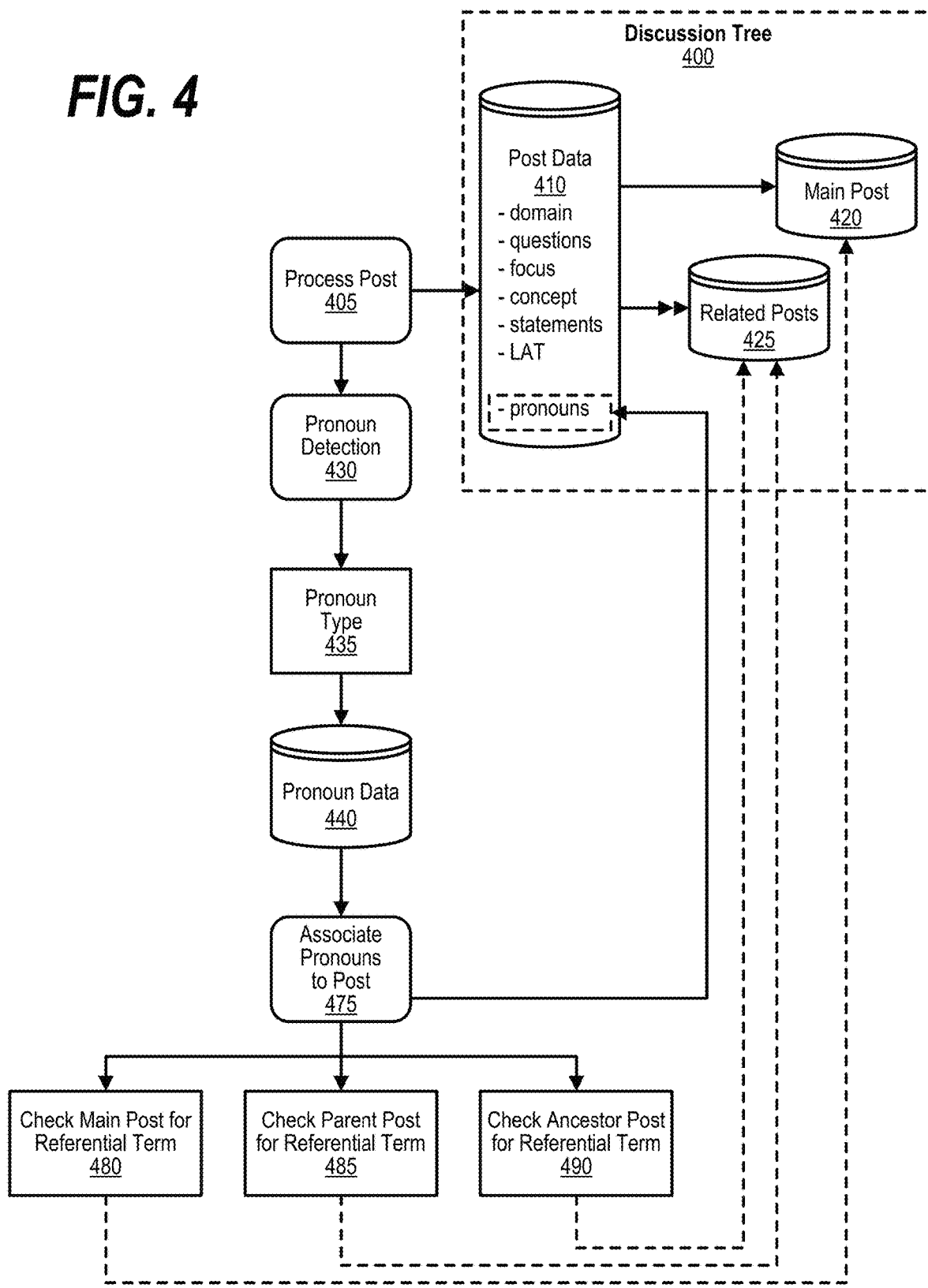
FIG. 4 is an exemplary diagram depicting various processes and data stores used to perform pronoun mapping for sub-context rendering.

FIG. 4 is an exemplary diagram depicting various processes and data stores used to perform inter-thread pronoun resolution. Discussion tree 400 is a collection of data pertaining to an online discussion that is being analyzed. Post data 410 shows data elements, or attributes, that are gathered or deduced from the various posts including the domain of the post, questions posed by the post, the focus of the post, any concepts included in the post, statements made in the post, etc. In addition, pronouns that are found and resolved for the post are also stored for the post.

In discussion tree 400, post data includes a main post 420 and relationships between posts, signified as related posts 425. Relationships include parent child relationships where one post (a child post) is posted after and references another post (the parent post). Main post 420 serves as a parent post to one or more other (child) posts in the discussion tree.

Pronoun detection process 430 detects pronouns in identified child posts and uses referential data found in parent posts to resolve such pronouns. Pronoun detection can be broken down into different types of pronoun detection. These different types of pronoun detection include pronoun type 435 where a pronoun found in a child post refers to a noun found in a parent post. For example, the pronoun "he" found in a child post might refer to a person that was referenced in a parent post. Pronoun pronouns are stored in data store 440.

Process 475 associates the pronouns found in the child posts to their respective terms found in their parent posts. The resolved pronoun (e.g., the pronoun "he" resolved to a particular person's name, etc.) is stored in the post's data in data store 410. To associate pronouns to parent posts, the parent posts with the relevant terms that is referenced by the pronoun found in the child post needs to be detected. This detection is performed by checking for referential terms in different types of posts.

At 480, the main post in the thread or discussion is checked for referential terms. At 485, the parent post of the child post is checked for referential terms. The referential terms might not be in the main or parent post, but might be in an intervening "ancestor" post between the main post and the parent post. At 490, these ancestor posts are checked for referential terms. When referential terms are found in a parent post (either the main post, the immediate parent post, or an ancestor post), the relationship is noted in discussion tree 400. In addition, pronouns might refer to participants of the online discussion. In this manner, process 475 additionally associates pronouns with one or more participants of the online discussion to which the pronouns refer. For example, if a participant ("Sally") posts an answer to on online discussion and a subsequent post says "she is so smart, she always gets the answer!", then the pronoun "she" in the subsequent post is associated to the participant ("Sally") to which the pronoun refers.

Figure 5:
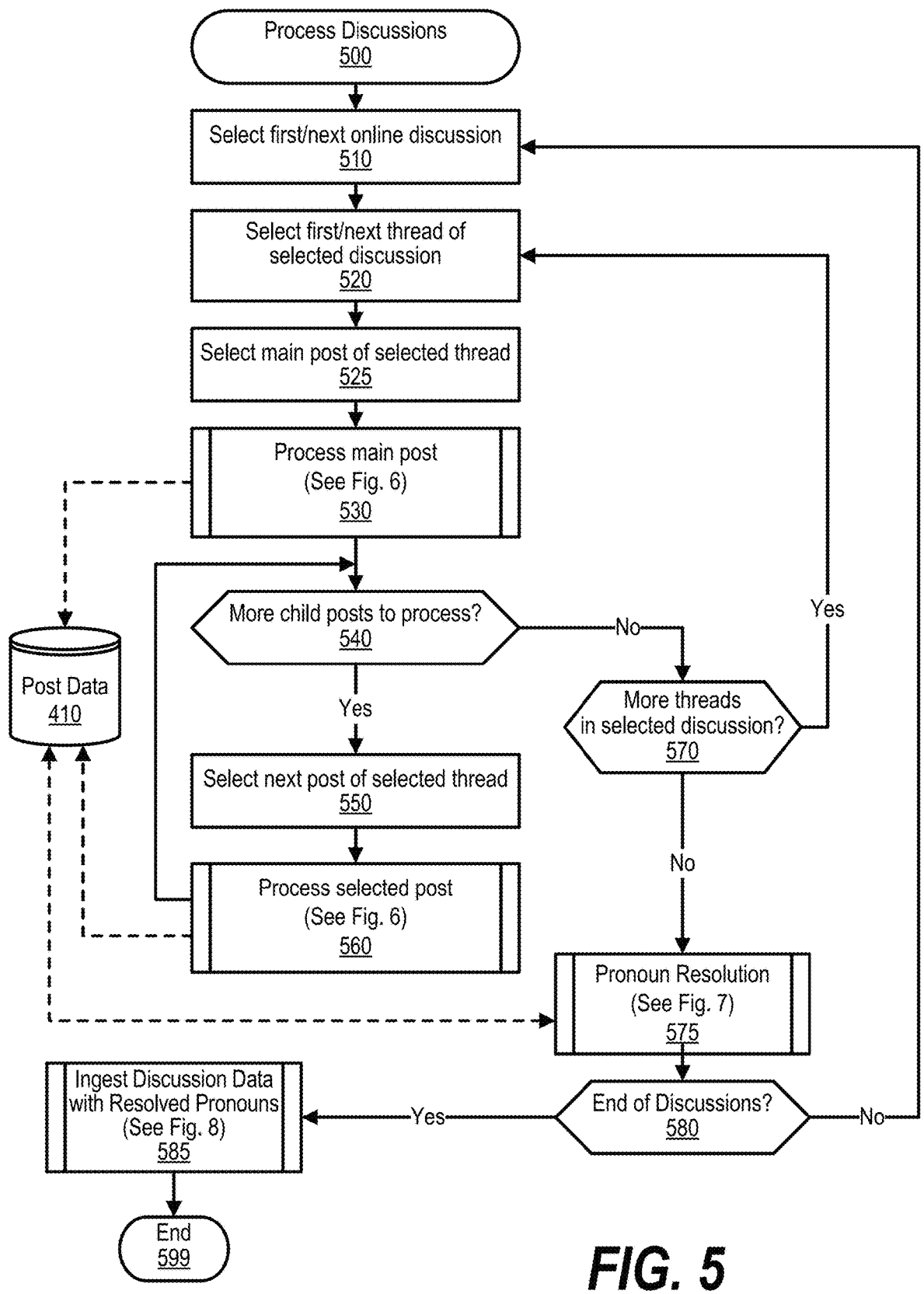
FIG. 5 is an exemplary high level flowchart that performs steps to process an online discussion for ingestion to a question answering (QA) system.

FIG. 5 is an exemplary high level flowchart that performs steps to process a discussion for ingestion to a question answering (QA) system. FIG. 5 processing commences at 500 and shows the steps taken by a process that performs a routine that processes online discussions. At step 510, the process selects the first online discussion that is being processed. At step 520, the process selects the first thread from the selected discussion. At step 525, the process selects the main post of selected thread.

Figure 6:
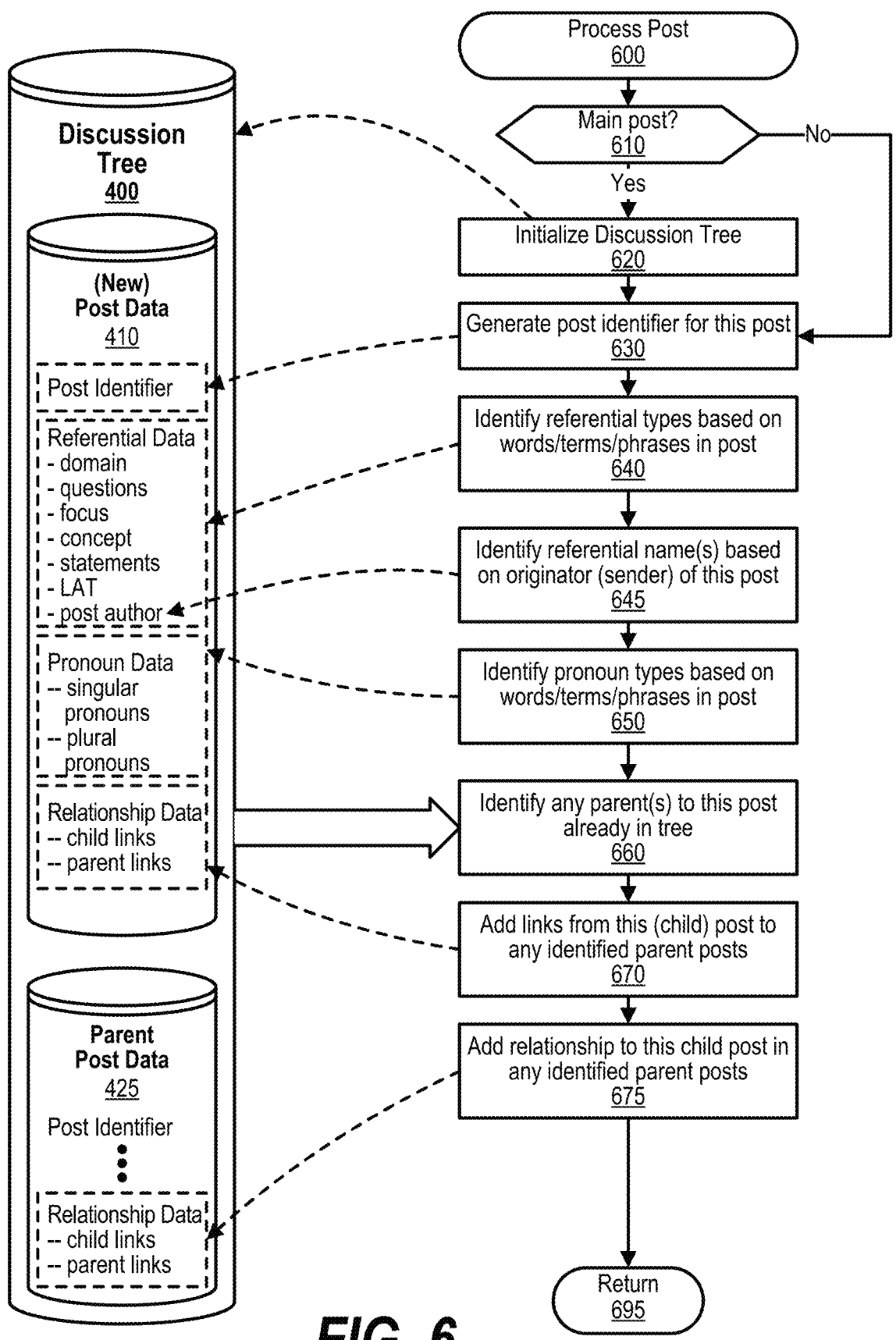
FIG. 6 is an exemplary flowchart that processes a selected post from a discussion.

At predefined process 530, the main post is processed (see FIG. 6 and corresponding text for processing details). The data gathered from processing the main post is stored as post data in data store 410. The process determines as to whether there are child posts to process in the selected thread (decision 540). If there are more child posts to process, then decision 540 branches to the 'yes' branch to process additional child posts. At step 550, the process selects the next post from selected thread. At predefined process 560, the process performs the process selected post routine (see FIG. 6 and corresponding text for processing details). The data gathered from the child post is stored as post data in data store 410. Processing then loops back to decision 540.

Once all of the child posts are processed, decision 540 branches to the 'no' branch whereupon the process determines as to whether there are more threads in the selected discussion to process (decision 570). If there are more threads in the selected discussion to process, then decision 570 branches to the 'yes' branch which loops back to step 520 to select the next thread from the selected discussion. This looping continues until there are no more threads in the selected discussion to process, at which point decision 570 branches to the 'no' branch for pronoun resolution.

Figure 7:
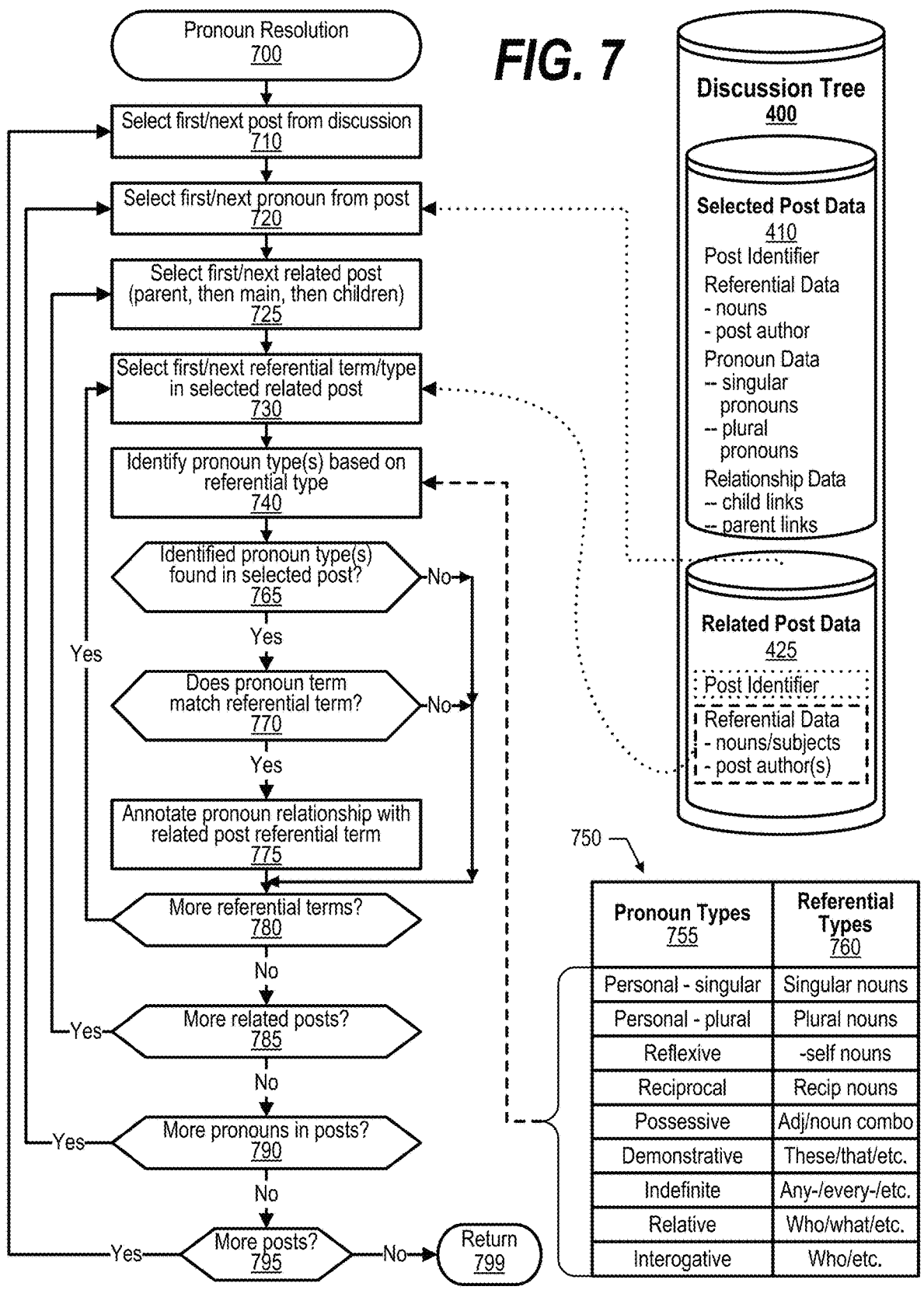
FIG. 7 is an exemplary flowchart depicting pronoun resolution of terms found in posts of a discussion.

At predefined process 575, the process performs the pronoun resolution routine (see FIG. 7 and corresponding text for processing details). The pronoun resolution routine detects pronouns found in posts from post data store 410, resolves the pronouns with terms found in referential data from other posts stored in post data store 410, and resolves the pronoun by storing the identified terms referenced by the pronouns in the post data 410.

The process determines as to whether the end of discussions being processed has been reached (decision 580). If the end of discussions being processed has not yet been reached, then decision 580 branches to the 'no' branch which loops back to step 510 to select the next discussion and process the posts in the discussion as described above. This looping continues until the end of the discussions being processed has been reached, at which point decision 580 branches to the 'yes' branch for further processing. At predefined process 585, the process performs the Ingest Discussion Data with Resolved Pronouns routine (see FIG. 8 and corresponding text for processing details). FIG. 5 processing thereafter ends at 599.

FIG. 6 is an exemplary flowchart that processes a selected post from a discussion. FIG. 6 processing commences at 600 and shows the steps that perform a routine that processes data found in a post. The process determines as to whether the post being processed is the main post of the discussion thread (decision 610). If the post being processed is the main post of the discussion thread, then decision 610 branches to the 'yes' branch whereupon, at step 620, the process initializes discussion tree 400 used to store the post data associated with this discussion thread. On the other hand, if the post being processed is not the main post of the discussion thread, then decision 610 branches to the 'no' branch bypassing step 620.

At step 630, the process generates a unique post identifier for this post and adds a record used to store this post data in discussion tree 400 with new post data 410. At step 640, the process identifies referential types based on words, terms, and phrases found in the post that is being processed. Referential data can include the domain of the post, questions posed by the post, the focus of the post, any concepts included in the post, statements made in the post, etc. In addition, pronouns might refer to participants of the online discussion. In this manner, at step 645, the process associates pronouns with one or more participants of the online discussion to which the pronouns refer. For example, if a participant ("Sally") posts an answer to on online discussion and a subsequent post says "she is so smart, she always gets the answer!", then the pronoun "she" in the subsequent post is associated to the participant ("Sally") to which the pronoun refers.

At step 650, the process identifies pronoun types based on the words, terms, and phrases found in post that is being processed. Types of pronouns include indefinite pronouns, personal-plural pronouns, personal-singular pronouns, possessive pronouns, etc.

At step 660, the process identifies any parent(s) to this post that are already included in discussion tree 400. Parent posts include the main post to the thread, the direct parent post of the thread, and any intervening parent (ancestor) posts between the main post and the direct parent post. At step 670, the process adds links from this (child) post to any identified parent posts that were found in step 660. At step 675, the relationships between this post and parent posts are added to post data included in data store 410. Links are added to this post as links to the parent posts, and in the respective parent post data (425) as links to this child post with data store 425 being a subset of data store 410 and shown as a separate data store for illustrative purposes. FIG. 6 processing thereafter returns to the calling routine (see FIG. 5) at 695.

FIG. 7 is an exemplary flowchart depicting pronoun resolution of terms found in posts of a discussion. FIG. 7 processing commences at 700 and shows the steps taken by a process that performs a routine that resolves pronouns found in a child post. At step 710, the process selects the first post from discussion tree 400. At step 720, the process selects the first pronoun from the selected post (if an pronoun exists in the post). At step 725, the process selects the first related post (immediate parent post, then main post, then ancestor posts) from discussion tree 400. At step 730, the process selects the first referential term/type from the selected related post.

Table 750 depicts the relationship between pronoun types (755) and their respective referential types (760). Pronouns are resolved with referential types found in a parent post of a noun or subject. At step 740, the process identifies pronoun type(s) for the selected pronoun based on the referential type as shown in table 750.

The process determines as to whether the identified pronoun type(s) were found in the selected child post (decision 765). If the identified pronoun type(s) were found in the selected child post, then decision 765 branches to the 'yes' branch for continued processing. On the other hand, if the identified pronoun type(s) were not found in the selected child post, then decision 765 branches to the 'no' branch bypassing decision 770 and step 775. The process determines as to whether the pronoun term found in the child post matches the referential term found in the parent post (decision 770). If the pronoun term found in the child post matches the referential term found in the parent post, then decision 770 branches to the 'yes' branch, whereupon, at step 775, the process annotates the pronoun relationship with related post referential term. In addition, at step 775, the pronoun found in the child post is resolved using the referential term found in the parent post. The annotated pronoun relationship data and the resolved pronoun data is stored in post data 410. On the other hand, if the pronoun term found in the child post does not match the referential term found in the parent post, then decision 770 branches to the 'no' branch bypassing step 775.

The process determines as to whether there are more referential terms (pronouns) that need to be processed (decision 780). If there are more referential terms that need to be processed, then decision 780 branches to the 'yes' branch which loops back to step 730 to select and process the next referential term. This looping continues until all referential terms have been processed, at which point decision 780 branches to the 'no' branch.

The process determines as to whether there are more related posts that need to be processed (decision 785). If there are more related posts that need to be processed, then decision 785 branches to the 'yes' branch which loops back to step 725 to select and process the next related post. This looping continues until all related posts have been processed, at which point decision 785 branches to the 'no' branch.

The process determines as to whether there are more pronouns included in the selected post that need to be processed (decision 790). If there are more pronouns included in the selected post that need to be processed, then decision 790 branches to the 'yes' branch whereupon processing loops back to step 720 to select and process the next pronoun from the selected post. This looping continues until all pronouns in the selected post have been processed, at which point decision 790 branches to the 'no' branch.

The process determines as to whether there are more posts in the discussion tree that need to be processed (decision 795). If there are more posts in the discussion tree that need to be processed, then decision 795 branches to the 'yes' branch which loops back to select and process the next post from the discussion tree. This looping continues until all of the posts have been processed, at which point decision 795 branches to the 'no' branch and processing returns to the calling routine (see FIG. 5) at 799.

Figure 8:
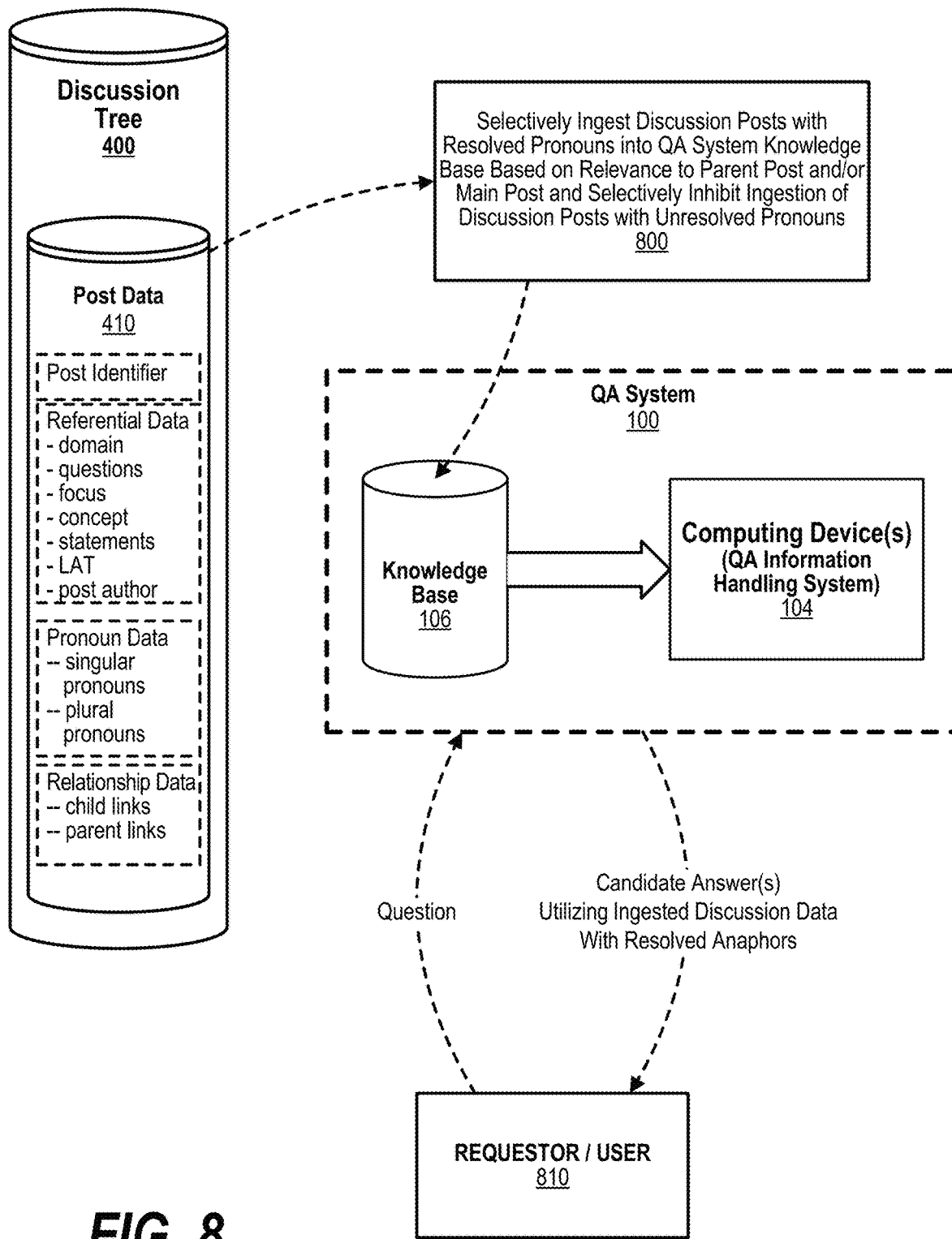
FIG. 8 is an exemplary flowchart depicting steps performed by the process that selectively ingests discussion data with resolved pronouns to a question answering (QA) system.

FIG. 8 is an exemplary flowchart depicting steps performed by the process that ingests discussion data with resolved pronouns to a question answering (QA) system. At step 800, the process selectively ingests discussion posts from discussion tree 400 with resolved pronouns into the QA System Knowledge Base (corpus) 106 with the ingestion based on the relevance to the parent post and/or the main post. In addition, the process selectively inhibits ingestion of discussion posts with unresolved pronouns as such unresolved pronouns could lead to formulation of incorrect answers by the QA system. When requestor 810, such as a user of QA system 100, poses a question to the QA system, the QA system may provide candidate answers that utilize the ingested discussion data with such ingested data including resolved pronouns found in child post data.

Figure 9:
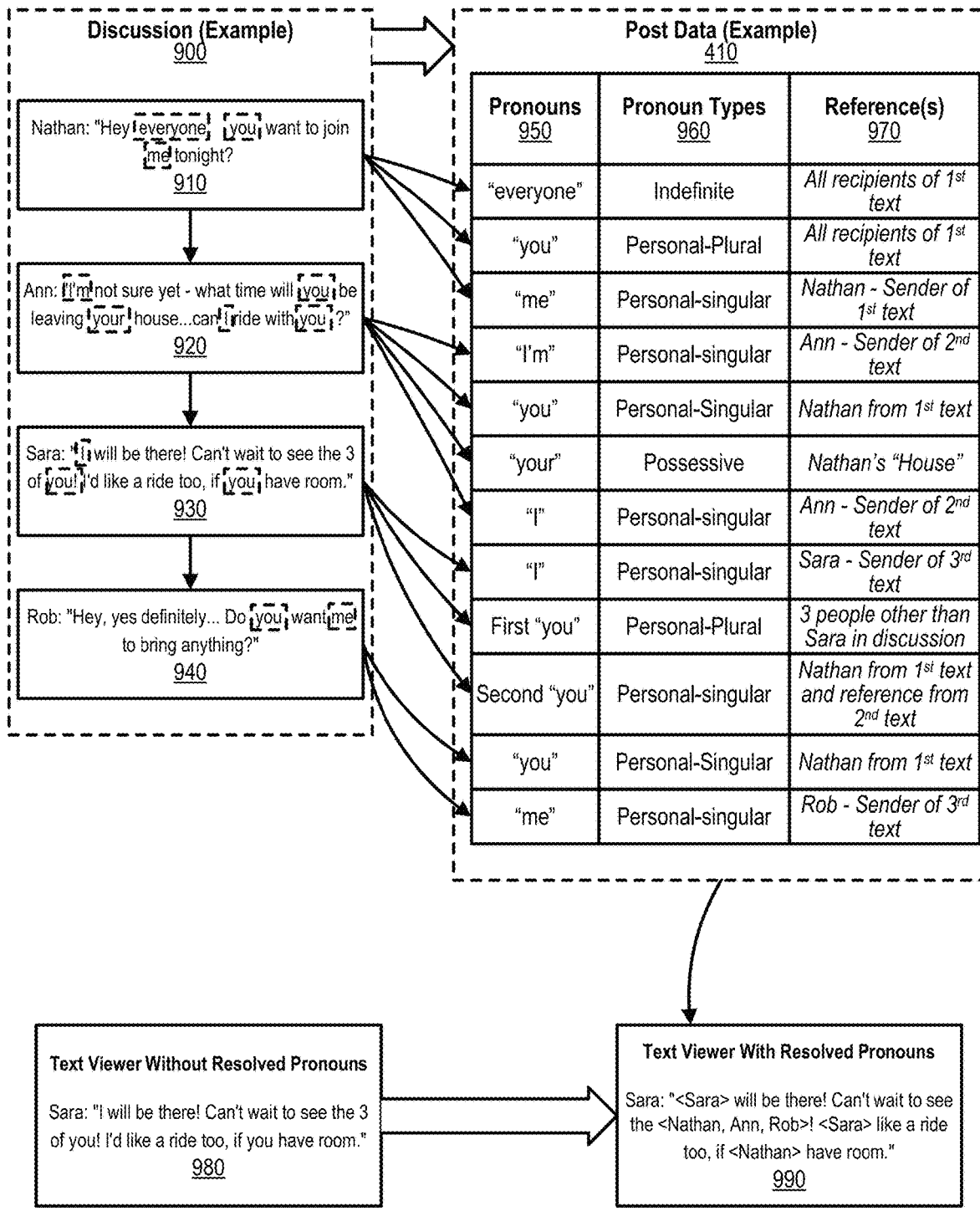
FIG. 9 is a diagram showing a text viewer with resolved pronouns.

FIG. 9 is a diagram showing a text viewer with resolved pronouns. Sample discussion 900 takes place between several participants. In discussion post 910, participant "Nathan" asks a question to all of the participants of the online discussion. Nathan's question "Hey everyone, you want to join me tonight?" is analyzed for pronoun references as discussed herein. Post data 410 keeps track of pronouns found 950, the types of the pronouns found 960, and the references (nouns) to which the pronoun refers. With regard to Nathan's post, the pronoun "everyone" is of type "indefinite" and refers to all of the participants of the online discussion. The pronoun "you" is a personal-plural pronoun type and also refers to all of the participants. Finally, the pronoun "me" is a personal-singular type of pronoun and refers to the sender of the message, in this case "Nathan."

In discussion post 920, participant "Ann" responds to Nathan's post with a post reading "I'm not sure yet—what time will you be leaving your house . . . can I ride with you?" The pronoun "I'm" is detected as a personal-singular pronoun and refers to the sender of this post, in this case Ann. Two occurrences of the pronoun "you" are detected both being personal-singular pronouns and both referring to Nathan (the sender of the first post). The pronoun "your" is detected as a possessive pronoun and refers to Nathan's house. Finally, the pronoun "I" is detected as another personal-singular pronoun and also refers to the sender of this post (Ann).

In discussion post 930, participant "Sara" posts: "I will be there! Can't wait to see the 3 of you! I'd like a ride too, if you have room." The pronoun "I" is detected as a personal-singular pronoun and refers to the sender of this post, in this case Sara. Two occurrences of the pronoun "you" are detected, however they are detected at referring to different nouns. The first occurrence of the pronoun "you" is detected as a personal-plural pronoun referring to the three other participants in the online discussion (Nathan, Ann, and Rob). The second occurrence of the pronoun "you" is detected as a personal-singular pronoun that refers to Nathan (the originator of the first post).

Finally, in discussion post 940, participant "Rob" posts: "Hey, yes definitely . . . . Do you want me to bring anything?" Here, the pronoun "you" is detected as a personal-singular pronoun referring to Nathan (the originator of the first post). The next pronoun in Rob's post ("me") is detected as another personal-singular pronoun that refers to Rob as the originator of this post.

Text viewer without pronoun resolution 980 is shown with how Sara's post from 930 above would appear. Here, the post would appear as "I will be there! Can't wait to see the 3 of you! I'd like a ride too, if you have room." In text viewer 980, it might not be clear to whom various pronouns refer. In contrast, text viewer with resolved pronouns 990 is shown with how the same post from 930 above appears with pronoun resolution. Here the post appears as "<Sara> will be there! Can't wait to see the <Nathan, Ann, Rob>! <Sara> like a ride too, if <Nathan> have room." Instead of the nouns replacing the pronouns, as shown, in alternative embodiments, hyperlinks could be used so that the nouns to which pronouns refer are displayed when the hyperlink is selected or the pronoun and the nouns are both displayed in the viewer.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
one or more data stores accessible by at least one of the processors;
a memory coupled to at least one of the processors; and
a set of computer program instructions stored in the memory and executed by at least one of the processors in order to perform actions of:
  detecting a pronoun included in one of a plurality of textual posts included in an online discussion;
  analyzing the plurality of textual posts using a natural language processing speech classification technique, wherein the result of the analysis is an identification of a noun to which the detected pronoun refers, and wherein the analysis further comprises:
    identifying, in the plurality of textual posts, a first post comprising the noun; and selecting a set of second posts, from the plurality of textual posts, that each comprises the detected pronoun; and displaying, on a display device, the noun to which the pronoun refers in each of the set of second posts.

2. The information handling system of claim 1 wherein the actions further comprise:

identifying two or more participants included in the online discussion, wherein each of the participants is associated with a different name; and identifying the noun based on an originator of one of the plurality of textual posts, wherein the originator is a selected one of the participants, and wherein the noun is the name associated with the selected participant.

3. The information handling system of claim 1 wherein the actions further comprise:

generating a modified version of the online discussion, wherein the modified version includes the noun to which the detected pronoun refers; and ingesting the modified version of the online discussion into a corpus utilized by a question answering (QA) system.

4. The information handling system of claim 1 wherein the actions further comprise wherein the first post was identified based upon a participant of the online discussion that created the first post and the analysis revealing that the detected pronoun refers to the creator of the identified first post.

5. The information handling system of claim 1 wherein the pronoun is a plural pronoun, wherein the noun to which the pronoun refers is a plurality of nouns, and wherein the actions further comprise:

identifying each of the plurality of nouns based on the analysis; and displaying, on the display device, the plurality of nouns referenced by the detected pronoun.

6. The information handling system of claim 5 wherein the plurality of nouns are each participants included in the online discussion, and wherein the actions further comprise:

identifying a first plurality of participants included in the online discussion, wherein each of the first plurality of participants is associated with a different name; and selecting a second plurality of participants from the first plurality, wherein the selection is based on one or more of the second plurality of participants being an originator of one of the plurality of textual posts to which the plural pronoun refers, and wherein the names of the second plurality of participants is included in the plurality of nouns.

7. A computer program product stored in a computer readable storage medium, comprising computer program code that, when executed by an information handling system, causes the information handling system to perform actions comprising:

detecting a pronoun included in one of a plurality of textual posts included in an online discussion;

analyzing the plurality of textual posts using a natural language processing speech classification technique, wherein the result of the analysis is an identification of a noun to which the detected pronoun refers, and wherein the analysis further comprises:

identifying, in the plurality of textual posts, a first post comprising the noun; and selecting a set of second posts, from the plurality of textual posts, that each comprises the detected pronoun; and displaying, on a display device, the noun to which the pronoun refers in each of the set of second posts.

8. The computer program product of claim 7 wherein the actions further comprise:

identifying two or more participants included in the online discussion, wherein each of the participants is associated with a different name; and identifying the noun based on an originator of one of the plurality of textual posts, wherein the originator is a selected one of the participants, and wherein the noun is the name associated with the selected participant.

9. The computer program product of claim 7 wherein the actions further comprise:

generating a modified version of the online discussion, wherein the modified version includes the noun to which the detected pronoun refers; and ingesting the modified version of the online discussion into a corpus utilized by a question answering (QA) system.

10. The computer program product of claim 7 wherein the actions further comprise wherein the first post was identified based upon a participant of the online discussion that created the first post and the analysis revealing that the detected pronoun refers to the creator of the identified first post.

11. The computer program product of claim 7 wherein the pronoun is a plural pronoun, wherein the noun to which the pronoun refers is a plurality of nouns, and wherein the actions further comprise:

identifying each of the plurality of nouns based on the analysis; and displaying, on the display device, the plurality of nouns referenced by the detected pronoun.

\* \* \* \* \*